March 27, 1928.  1,663,537

P. A. BRICK

DUMPING TRUCK

Filed March 4, 1926   2 Sheets-Sheet 1

Inventor
P. A. Brick
By Frederick L. Stitt
Attorney

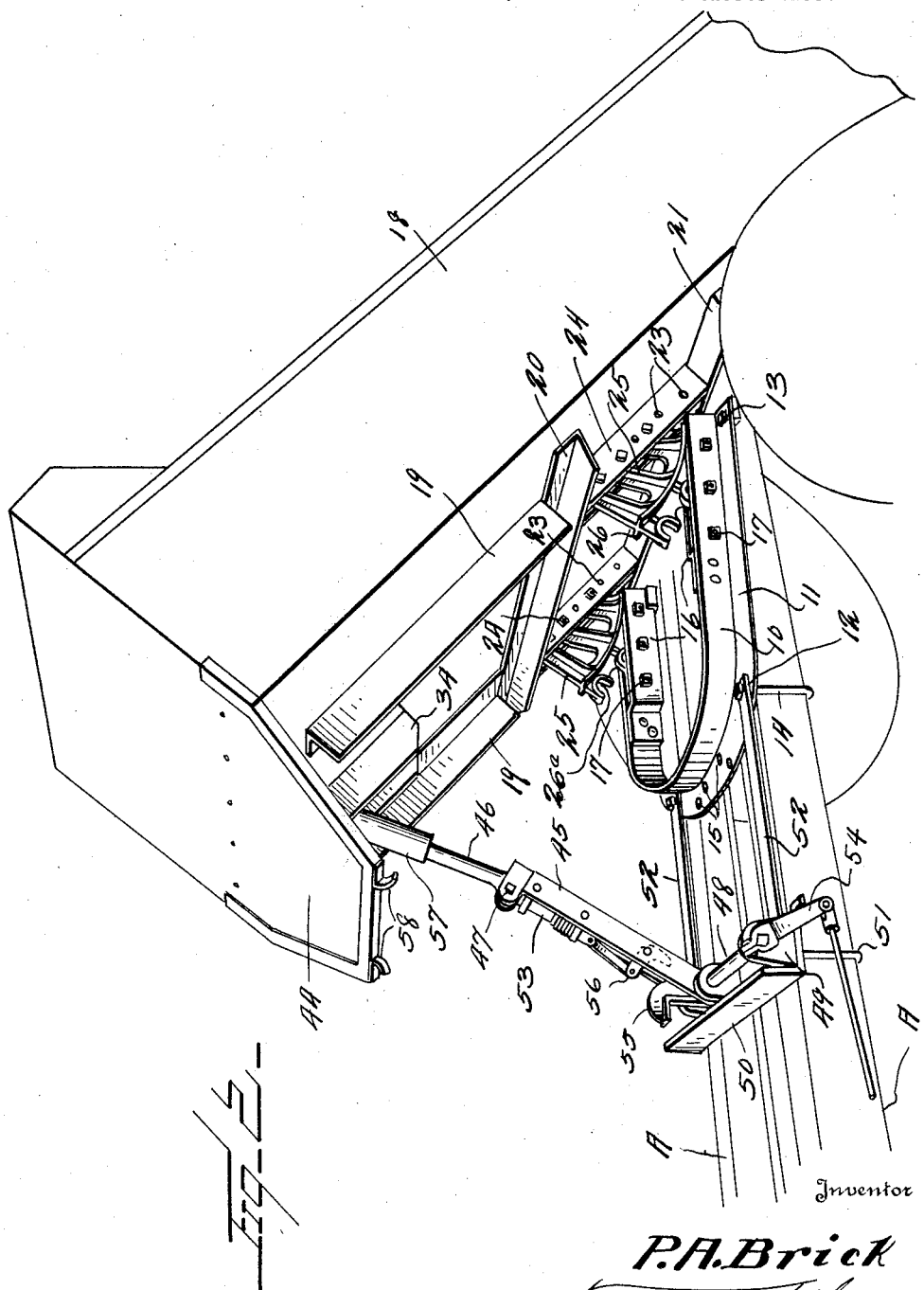

Patented Mar. 27, 1928.

1,663,537

UNITED STATES PATENT OFFICE.

PERRY A. BRICK, OF GALION, OHIO, ASSIGNOR TO THE NATIONAL GRAVE VAULT CO., OF GALION, OHIO, A CORPORATION OF OHIO.

DUMPING TRUCK.

Application filed March 4, 1926. Serial No. 92,368.

This invention relates to dumping trucks of that character wherein the body is mounted on the chassis for tilting movement, and the general object of the invention is to provide means for tiltably supporting the truck body on the chassis which will permit the use of either a power elevating or tilting means or of a gravity actuated tilting means.

A further object is to provide for this purpose a supporting frame which is adaptable to rest upon and be clamped to the frame beams of the truck chassis and is further formed so as to be engaged with and support either the "stiff arm" unit illustrated and described in a pending application filed by Ernest E. Eisenhut on February 3, 1925, Serial No. 6,608, or with the power actuated elevating or tilting unit shown and described in my pending application for patent filed on the 4th day of March, 1926, Serial No. 92,370, and thus permit either unit to be used as may be desired in connection with the same supporting frame and further to so form the body of the truck that either unit may be used therewith.

A further object is to so construct the body that the rockers may be adjusted toward or from the rear end of the body to permit the body to be used with either the aforesaid gravity actuated dumping means or the power operated dumping means.

My invention is illustrated in the accompanying drawings wherein:—

Figure 2 is a perspective view of another form of dumping truck having my invention applied thereto;

Figure 1:
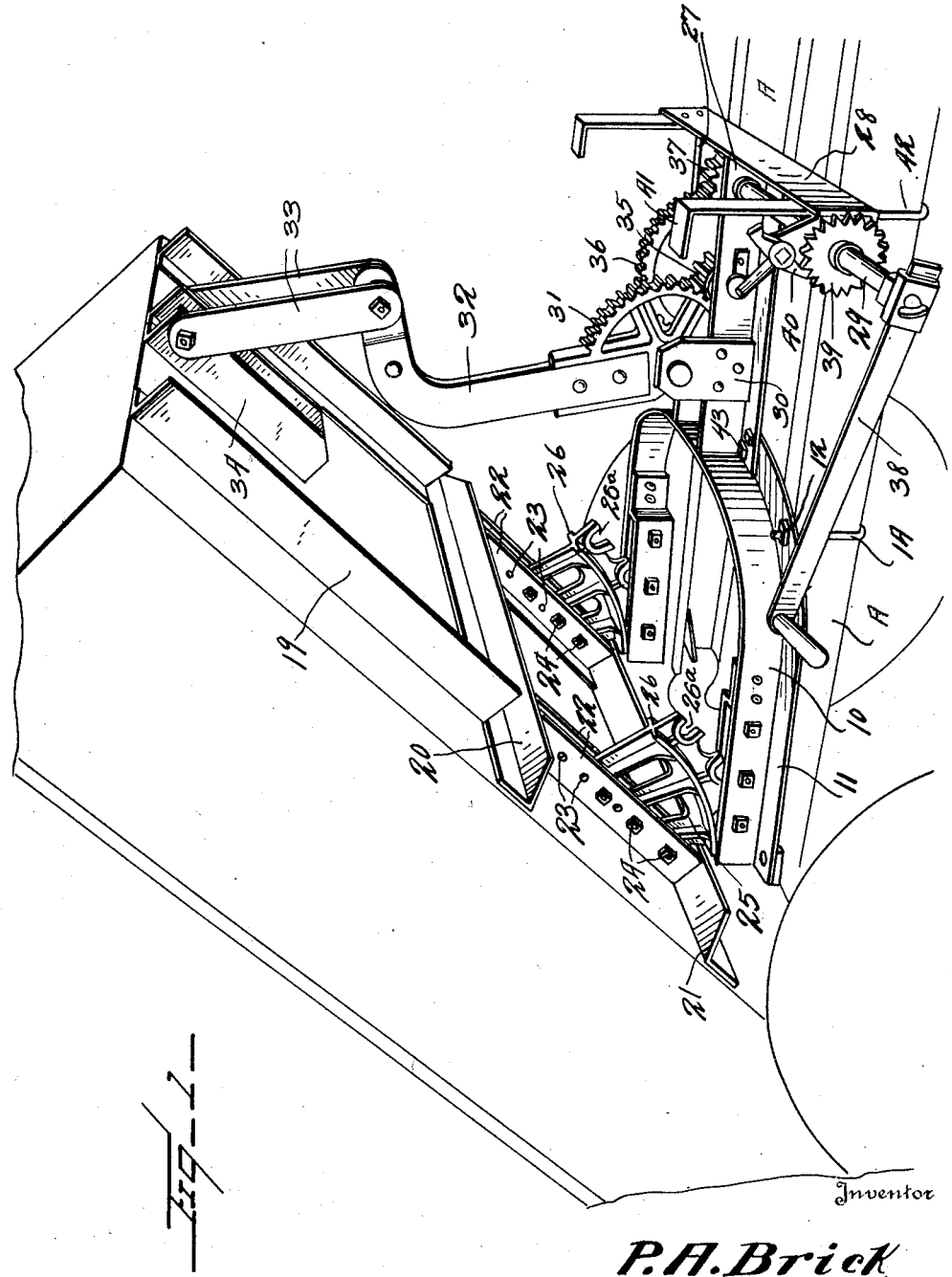
Figure 1 is a perspective view of one form of dumping truck having my invention applied thereto.

From these drawings it will be seen that the support upon which the body is mounted comprises a substantially U-shaped frame, designated 10, which is formed of angle iron or channel-iron to provide an outstanding base flange 11, this flange being apertured as at 12 and 13. Through the apertures 12 pass the clamp bolts 14 which engage this U-shaped frame and the frame beams A of the truck chassis. Suitable clamping bolts of any desired character may pass through the apertures 13 for a like purpose. It will be noted that the apertures 12 are disposed at the junction of the longitudinally extending legs of the U-shaped frame with the slightly curved cross-bar portion of the U-shaped frame. The cross-bar portion, adjacent the middle, is also provided with bolt holes 15. Riveted or otherwise attached to the inside faces of the legs of the U-shaped frame are the longitudinal bars 16, and a plurality of bolts or pins 17 extend through each of these bars and the adjacent portions of the leg of the U-shaped frame, these bolts being spaced from each other for a purpose to be later stated.

The body 18 is preferably of sheet steel and has attached to its under face the longitudinal extending irons 19, these angle irons being disposed between the middle of the truck body and the sides thereof and extending from the forward end of the truck body rearward to any desired point. Transversely disposed angle or channel irons 20 and 21 are attached to the under face of the truck body and extend to or beyond the longitudinal irons 19. Disposed between irons 20 and 21 are two pairs of longitudinally extending irons 22, the irons of each pair being spaced a relatively slight distance from each other and each pair of these angles irons 22 being provided with a plurality of aligning perforations 23 through which the bolts 24 may pass. The outside members of irons 22 may also be replaced by a continuation of longitudinal irons 19. It is to be understood that though I have referred to angle irons, channel irons may be used in place of the angle irons wherever desired.

Disposed between each pair of irons 22 is a rocker 25 such as illustrated in my pending application before referred to, each rocker being approximately segmental in shape and formed with the arcuate laterally projecting flanges 26 and below these flanges the web of the rocker is formed with a plurality of recesses 26ᵃ disposed in an arcuate line and adapted to be successively engaged with the transversely extending pins of bolts 17. The forward end of each rocker is longer than the rear end thereof and as the body is tilted the rockers rock upon the pins 17 and thus the fulcrum is shifted rearward as the body is tilted. By providing a plurality of perforations 23 it is possible to adjust the rockers nearer to or further from the rear end of the truck body.

So far I have described mechanism which is common to both the arrangement shown in Figure 1 and that shown in Figure 2.

The power tilting unit used in connection with the truck, as illustrated in Figure 1, is supported upon two longitudinally extending angle irons 27. These angle irons 27 are connected at their front ends to a transverse angle iron 28 which, as illustrated, extends beyond the angle irons 27. These angle irons 27 carry the shaft 29 and the angle irons 27 also carry upwardly extending ears or brackets 30, between which is oscillatably mounted the segment gear 31 which carries the angular arm 32 connected by links 33 to a channel iron 34 riveted, bolted or otherwise mounted upon the bottom of the truck between the angle irons 19. This segment gear 31 is engaged by a pinion 35, the shaft of which carries the gear wheel 36 and this gear wheel is engaged by a pinion 37 mounted upon the shaft 29. The shaft 29 is actuated by means of a crank 38 and the truck body is held in any adjusted position by a ratchet wheel 39 and the pawl 40. Attached to the transverse angle iron 28 are two upstanding brackets or rests 41 upon which the body of the truck is supported when the truck is lowered, and bolts 42 are attached to the angle iron 28 and engage beneath the beams of the truck chassis.

The rear ends of the angle irons 27 are connected to the flange 11 of the U-shaped frame 10 by means of bolts 43 which pass through the apertures 15 in this flange 11 and when the angle irons 27 are so connected to the U-shaped frame, the hoisting unit supported by these irons 27 is made practically a part of the U-shaped supporting frame but is readily detachable therefrom to permit the substitution of the unit shown in Figure 2. The operation of raising or lowering the truck body will be obvious from Figure 1. The crank 38 is turned in one direction which through the gearing will cause the lifting arm 32 to rise from a horizontal position to an approximately vertical position thus tilting the truck body and when the crank is turned in a reverse direction the truck body will be lowered. When the power hoisting unit is to be applied to the truck the rockers 25 are bolted to the first, second and fourth holes 23 from the rear end of the body.

When the truck is to be converted from a power tilted truck to a gravity tilted truck the power tilting unit is, of course, detached from the flange 11 and the arm 32 and the links 33 are, of course, disengaged from the truck body and the counterweight 44, such as is illustrated in my pending application before referred to, is bolted to the forward end of the truck body. A folding prop is mounted upon the chassis of the truck, this prop being either of the form shown in my pending application above referred to or such as is shown in the application of Ernest Eisenhut, before referred to. This folding prop consists of two sections 45 and 46 pivoted to each other at 47, the lower section 45 being mounted upon a transversely extending shaft 48 in turn mounted in ears 49 extending upward from an angle iron 50. This angle iron 50 rests upon and extends across the beams A of the truck chassis and is held thereto by the clamp bolts 51 and to this extent is the equivalent of the transverse angle iron 28. This angle iron 50 is engaged with the U-shaped supporting frame 10 by means of longitudinal extending members having in Figure 2 the form of rods, designated 52, which members are bolted to the flange 11 by the clamping bolts 14 previously described. There are two of these rods 52 and, therefore, it will be seen that these rods will rigidly support the unit constituted by the angle iron 50 and the prop formed of the members 45 and 46 in spaced relation to the supporting frame 10 and will prevent any relative shifting of the unit and the supporting frame.

The two section prop whereby the body is supported in a tilted position is fully described in the aforesaid application of Ernest Eisenhut, and in my aforesaid application, and, therefore, requires no lengthy description here. Sufficient to say that the lower section 45 of the prop, as illustrated, is provided with a bolt 53 urged into engagement with a notch on the lower end of the upper section 46 and that this bolt springs into engagement with this notch when the two sections 45 and 46 are brought into approximate alignment and that when the shaft 48 is rotated in a clockwise direction by means of the arm 54, which is connected to a lever on the body, the latch 55 in its rearward movement will strike a bell crank lever 56 and act to retract this bolt 53. As the bolt 53 is retracted the latch 55 will give an initial impulse to the section 45 acting to break the two section prop and gravity will then act to cause the body to return to its horizontal position, whereupon the latch 55 will engage the counterweight 44 to hold the body in its lowered position. It will be seen that when the body rocks from a tilted position to a horizontal position that the fulcrum will be shifted rearward because of the peculiar shape of the rockers and hence when the body is loaded, the fulcrum will be rearward of the middle of the body and as a consequence the body will tend to shift to its tilted position, and as soon as the latch 55 is released, the body will automatically shift to its tilted position, shifting the two sections of the prop into aligned position. The rockers provide for a shifting of the fulcrum to a point forward of the middle of the body when the body is tilted, so that then when the prop is broken and enabled to fold up, the weight of the truck forward of its fulcrum will cause it to return to its horizontal position. The upper section 46 operates against a spring contained within a spring yoke or case, designated 57, and thus is pivotally engaged with the channel iron 34. Where the body is used as a gravity actuated dumping body the rockers are bolted to the first, second and fourth holes from the front end of the body thus changing the center of gravity to a point rearward of the center of gravity for the power actuated dumping body. Preferably the counterweight 44 will be provided with downwardly projecting and laterally inclined ears 58 which will engage the beams A and prevent lateral swaying when the body is lowered.

It will be seen that I have provided in this construction a two-in-one dump body combination for mounting on any suitable chassis as for instance, a Ford chassis, and a contractor or truckman having the supporting frame 10 and a truck body constructed in accordance with the drawings can convert the truck either into a gravity actuated dumping body or a power actuated dumping body and thus it is not necessary for the truckman to have two bodies for these two types of dumping mechanisms but merely necessary for him to have the two units for holding the body in its elevated position and with but little labor and at the expenditure of little time he can convert his dump body into that type most suitable for the class of work which he is performing at that time. Certain work requires that the body shall be tilted by power and certain other work requires that the body shall be tilted by gravity and by the mechanism described it is readily possible for the truckman to make his truck suitable for either of these classes of work.

It may be also noted that the rocker castings are not only shiftable longitudinally of the body but that in case a rocker breaks for any reason it may be readily removed and a new rocker substituted at merely the cost of the broken rocker. Furthermore, all of the parts which I have illustrated are simple, easily repaired or replaced and very positive in their action.

Preferably the body will be sheet steel with the bottom and sides of one piece. A front sheet is electrically welded to the bottom and sides and the front and sides are bent outward and downward at the top edges to strengthen them against bending. The longitudinal and transverse angle irons are electrically welded to the bottom sheet and not only provide suitable attaching points for the lifting or supporting mechanism but also reenforce the body.

While I have illustrated certain details of construction and arrangement of parts which I have found to be particularly effective in actual practice I do not wish to be limited thereto as it is obvious that many changes might be made therein without departing from the spirit of the invention as defined in the appended claim.

I claim:—

The combination with a truck body having two pairs of longitudinally depending angle irons extending from its bottom and having rockers adjustably engaged with said angle irons for longitudinal adjustment toward or from the rear end of the body, of an approximately U-shaped supporting frame therefor formed of angle iron to provide an outwardly extending base flange adapted to rest upon a truck chassis, clamp bolts engaging the flange and adapted to engage the beams of the truck chassis, the legs of said frame having parallel irons and transverse pins thereby constituting rocker bearings, the rockers being toothed to engage said pins.

In testimony whereof I affix my signature.

PERRY A. BRICK.